(12) United States Patent
Lingle et al.

(10) Patent No.: US 11,988,451 B2
(45) Date of Patent: May 21, 2024

(54) DRIFT ELIMINATOR AND METHOD OF MAKING

(71) Applicant: Brentwood Industries, Inc., Reading, PA (US)

(72) Inventors: Luke Lingle, Grantville, PA (US); Christopher Bowman, Glenmoore, PA (US); Nicholas Emil Gavenas, Ephrata, PA (US)

(73) Assignee: Brentwood Industries, Inc., Reading, PA (US)

( * ) Notice: Subject to any disclaimer, the term of this patent is extended or adjusted under 35 U.S.C. 154(b) by 304 days.

(21) Appl. No.: 17/306,400

(22) Filed: May 3, 2021

(65) Prior Publication Data
US 2021/0381771 A1    Dec. 9, 2021

Related U.S. Application Data

(60) Provisional application No. 63/014,450, filed on Apr. 23, 2020.

(51) Int. Cl.
*F28C 1/16* (2006.01)

(52) U.S. Cl.
CPC ..................... *F28C 1/16* (2013.01)

(58) Field of Classification Search
CPC ....... F16B 5/0096; B21D 39/031; B32B 3/06; B32B 3/28; B32B 3/30; B01J 2219/3221; B01J 2219/32248; B01J 2219/32251; B01J 2219/32255; B01J 2219/32408; B01J 2219/32416; B01J 2219/32483; B01J 2219/328; B01J 19/32; F28F 25/087; B29C 65/607; B29C 66/21; B29C 66/438; B29C 66/71; B29C 66/721; B29C 66/73921; B29C 65/56; B29L 2024/00; B29L 2031/18; F28C 1/16; Y02B 30/70
See application file for complete search history.

(56) References Cited

U.S. PATENT DOCUMENTS

| | | | | |
|---|---|---|---|---|
| 2,470,652 A | * | 5/1949 | Scofield | B01J 19/32 261/100 |
| 2,759,719 A | * | 8/1956 | Odenthal | F28F 25/087 261/DIG. 11 |
| 2,793,017 A | * | 5/1957 | Lake | F28F 25/087 55/440 |
| 2,917,292 A | * | 12/1959 | Hittrich | F28F 25/087 261/DIG. 11 |

(Continued)

*Primary Examiner* — Stephen Hobson
(74) *Attorney, Agent, or Firm* — Design IP

(57) ABSTRACT

A drift eliminator is provided that includes a plurality of blades interleaved by a plurality of spacers. Each spacer has a first leg, a second leg, and a support strip, each of the first and second legs including an upper edge and a lower edge, with the support strip extending laterally from the upper edge of the first leg to the upper edge of the second leg. Each blade includes at least one portion having a plurality of alignment slots formed therein, the plurality of alignment slots extending from an upper surface of the blade portion to a lower surface of the blade portion. Each spacer includes a plurality of alignment tabs extending from the first leg and the second leg, each of the plurality of alignment tabs interfiting with a corresponding one of the plurality of alignment slots in the at least one first blade portion.

18 Claims, 14 Drawing Sheets

(56) References Cited

U.S. PATENT DOCUMENTS

| | | | | |
|---|---|---|---|---|
| 2,977,103 A * | 3/1961 | Smith | F28F 25/087 | 261/111 |
| 3,116,989 A * | 1/1964 | Warren | F24F 8/133 | 55/440 |
| 3,235,234 A * | 2/1966 | Beaudoin | C02F 7/00 | 210/150 |
| 3,430,694 A * | 3/1969 | Cardell | F28D 9/0031 | 165/DIG. 384 |
| 3,540,702 A * | 11/1970 | Uyama | F28F 25/087 | 261/DIG. 11 |
| 3,733,063 A * | 5/1973 | Loetel | F28F 25/087 | 261/DIG. 11 |
| 3,899,805 A * | 8/1975 | McMillan | A44B 18/0053 | 24/584.1 |
| 4,052,491 A * | 10/1977 | Lefevre | F28F 25/087 | 261/DIG. 11 |
| 4,107,241 A * | 8/1978 | Braun | B01D 3/22 | 428/116 |
| 4,320,073 A * | 3/1982 | Bugler, III | F28F 25/087 | 261/DIG. 11 |
| 4,337,217 A * | 6/1982 | Braun | B01J 19/32 | 261/112.1 |
| 4,344,899 A * | 8/1982 | Monjoie | B01J 19/32 | 428/184 |
| 4,361,426 A * | 11/1982 | Carter | F28F 25/087 | 55/440 |
| 4,395,448 A * | 7/1983 | Lefevre | B29C 65/56 | 428/116 |
| 4,553,993 A * | 11/1985 | Wigley | B01D 45/06 | 55/440 |
| 4,557,876 A * | 12/1985 | Nutter | B01J 19/32 | 428/596 |
| 4,668,443 A * | 5/1987 | Rye | F28F 25/087 | 165/166 |
| 4,905,313 A * | 2/1990 | Stackhouse | B01J 19/32 | 261/112.2 |
| 5,203,894 A * | 4/1993 | Chowaniec | B01D 45/08 | 55/440 |
| 5,204,027 A * | 4/1993 | Armstrong | F28F 25/087 | 261/112.2 |
| 5,217,788 A * | 6/1993 | Rye | B01J 19/32 | 428/184 |
| 5,296,009 A * | 3/1994 | Duke | B01D 45/08 | 55/440 |
| 5,616,289 A * | 4/1997 | Maeda | B01F 25/4323 | 261/112.2 |
| 5,944,094 A * | 8/1999 | Kinney, Jr. | F28C 1/14 | 261/DIG. 11 |
| 6,000,685 A * | 12/1999 | Groten | B01J 19/32 | 55/497 |
| 6,083,302 A * | 7/2000 | Bauver, II | B01D 53/504 | 55/440 |
| 6,206,350 B1 * | 3/2001 | Harrison | F28C 1/16 | 261/DIG. 11 |
| 6,260,830 B1 * | 7/2001 | Harrison | F28C 1/04 | 55/440 |
| 6,315,804 B1 * | 11/2001 | Bradley | F28C 1/16 | 55/443 |
| 6,517,058 B1 * | 2/2003 | Engh | F28F 25/087 | 261/DIG. 11 |
| 6,544,628 B1 * | 4/2003 | Aull | B29C 66/21 | 428/184 |
| 6,710,013 B1 * | 3/2004 | Kato | B01D 53/885 | 502/527.22 |
| 6,770,121 B1 * | 8/2004 | Sindel | B01D 45/08 | 55/440 |
| 7,655,069 B2 * | 2/2010 | Wright | B01D 53/14 | 96/134 |
| 7,674,304 B2 * | 3/2010 | Krell | B01D 1/305 | 96/356 |
| 8,944,417 B2 * | 2/2015 | Ausner | B01J 19/32 | 261/112.2 |
| 9,555,390 B2 * | 1/2017 | Krell | B01J 19/32 | |
| 10,076,722 B2 * | 9/2018 | Takeyama | B01D 3/324 | |
| 10,677,538 B2 * | 6/2020 | Shin | F28F 3/046 | |
| 11,333,180 B2 * | 5/2022 | Kulick, III | B32B 3/30 | |
| 11,358,116 B2 * | 6/2022 | Edwards | B01J 19/32 | |
| 11,642,647 B2 * | 5/2023 | Edwards | B01J 19/32 | 261/112.1 |
| 2001/0053108 A1 * | 12/2001 | Jahn | B01J 19/32 | 366/337 |
| 2002/0142130 A1 * | 10/2002 | Irwin | F25J 3/04909 | 428/184 |
| 2003/0033708 A1 * | 2/2003 | Aull | B21D 39/031 | 29/524.1 |
| 2007/0297956 A1 * | 12/2007 | Repasky | B01J 19/32 | 29/890 |
| 2008/0093294 A1 * | 4/2008 | Kulick | C02F 3/101 | 210/150 |
| 2009/0320689 A1 * | 12/2009 | Krell | F28C 1/16 | 96/299 |
| 2010/0015385 A1 * | 1/2010 | Woicke | B29C 66/1312 | 156/196 |
| 2011/0259804 A1 * | 10/2011 | Reitzel | C12M 27/22 | 210/336 |
| 2012/0031596 A1 * | 2/2012 | Kippel | F28D 5/00 | 165/168 |
| 2012/0125581 A1 * | 5/2012 | Allen | H02S 20/00 | 156/291 |
| 2013/0172170 A1 * | 7/2013 | Kowalczyk | B01J 19/32 | 422/255 |
| 2013/0172171 A1 * | 7/2013 | Kowalczyk | B01J 8/34 | 422/255 |
| 2014/0053926 A1 * | 2/2014 | Kulick, III | B01J 19/32 | 137/561 R |
| 2014/0131902 A1 * | 5/2014 | Huang | B01D 53/1475 | 261/112.1 |
| 2014/0352345 A1 * | 12/2014 | Hakbijl | B21D 53/04 | 29/890.035 |
| 2015/0136582 A1 * | 5/2015 | Takeyama | B01D 53/18 | 261/109 |
| 2015/0330710 A1 * | 11/2015 | Curtis | F28C 1/16 | 261/29 |
| 2015/0336080 A1 * | 11/2015 | Krell | B01J 19/32 | 261/97 |
| 2017/0050168 A1 * | 2/2017 | Kehrer | B32B 7/08 | |
| 2017/0198992 A1 * | 7/2017 | Shin | F28C 1/04 | |
| 2018/0304543 A1 * | 10/2018 | Mayer | B29C 65/606 | |
| 2018/0353927 A1 * | 12/2018 | Nieuwoudt | B01J 19/32 | |
| 2019/0060916 A1 * | 2/2019 | Schulz | B01F 27/111 | |
| 2019/0076815 A1 * | 3/2019 | Lambert | C10G 11/182 | |
| 2019/0210000 A1 * | 7/2019 | Headley | B01D 3/008 | |
| 2020/0171782 A1 * | 6/2020 | Porcheret | B32B 3/28 | |
| 2021/0040968 A1 * | 2/2021 | Kulick, III | B32B 3/28 | |
| 2021/0187473 A1 * | 6/2021 | Edwards | F28C 1/04 | |
| 2021/0370258 A1 * | 12/2021 | Edwards | F28F 25/087 | |
| 2021/0381771 A1 * | 12/2021 | Lingle | F28C 1/16 | |
| 2021/0389064 A1 * | 12/2021 | Kulick, III | F28F 21/06 | |
| 2023/0003469 A1 * | 1/2023 | Gavenas | F28F 25/085 | |
| 2023/0073797 A1 * | 3/2023 | Bowman | H01J 37/32146 | |

\* cited by examiner

DRIFT ELIMINATOR AND METHOD OF MAKING

BACKGROUND

Water loss to the environment due to the evaporative cooling process is common in cooling towers. Such evaporation is typically in the form of pure water vapor and presents no risk of harm to the environment. Drift refers to the undesirable loss of water to the environment via small water droplets which become entrained in the effluent air stream for a cooling tower. Such water droplets can carry chemicals and minerals which have a deleterious impact on the outside environment, such as the corrosion of manmade structures and damage to plantlife.

To combat this problem, the cooling tower industry has developed drift eliminators, which are designed to capture droplets of water entrained in a cooling tower's effluent air stream (called "drift"). Drift eliminators use stacks of undulating blades as a medium through which a cooling tower's air stream must travel. Drift eliminators prevent drift from escaping the cooling tower by causing water droplets contained in the air stream to impact with the drift eliminator wall and fall back into the cooling tower system. Efficient drift eliminators reduce drift losses to less than 0.001% of the re-circulating water flow rate.

Many existing drift eliminators are formed primarily from polymeric materials. These types of drift eliminators are not suitable for high-temperature (e.g., 125 degrees F. and above) or corrosive cooling tower environments, which limits the applications in which they can be used. Efforts have been made to provide metal blade materials, but are either prohibitively expensive and/or heavy for most applications.

In addition, many existing metal drift eliminators are offered in a single size or a small number of size options. This is due to the assembly methods used in the prior art, such as single-piece end caps. This limits the ability of users to implement custom applications. In addition, it is not practical to cut metal drift eliminators to size onsite. Currently, there is a need for self-extinguishing and/or non-flammable components for the cooling tower industry to reduce or eliminate the potential for fires. Metals are known to achieve this, but most metal materials are expensive and heavy, so it is desirable to use as little metal as possible to reduce costs. Additionally, drift eliminators are typically formed and sold in packs whose size cannot be customized by the user.

Accordingly, there is a need for a drift eliminator system that is modular and able to be used in high-temperature and/or corrosive applications, while maintaining a reasonable cost.

SUMMARY

Several specific aspects of the systems and methods of the subject matter disclosed herein are outlined below.

Aspect 1: An apparatus comprising:
a blade array comprising a plurality of blades that are vertically aligned, each of the plurality of blades having an undulating cross-sectional shape and being spaced apart from an adjacent blade by a plurality of spacers, each of the plurality of spacers having first and second legs connected by a support strip, the support strip having a bolt aperture formed therein, each of the plurality of spacers being located in one of a plurality of spacer arrays, each of the plurality of spacers in any one of the plurality of spacer arrays being vertically aligned;

wherein each of the plurality of spacer arrays further includes a bolt that extends through all of the plurality of spacers in that one of the plurality of spacer arrays, the bolt having first and second ends and a fastener secured to each of the first and second ends.

Aspect 2: The apparatus of Aspect 1, wherein each of the plurality of spacers is a separate structure from every other of the plurality of spacers.

Aspect 3: The apparatus of any of Aspects 1-2, wherein each of the plurality of spacers defines a blade spacing between two of the plurality of blades and each of the blades has a maximum rise, the maximum rise being greater than the blade spacing.

Aspect 4: The apparatus of Aspect 3, wherein the maximum rise is at least 20% greater than the blade spacing.

Aspect 5: The apparatus of Aspect 3, wherein the maximum rise is at least twice the blade spacing.

Aspect 6: The apparatus of any of Aspects 1-5, wherein the undulating cross-sectional shape of each of the plurality of blades extends downwardly from an apex to a front edge and a rear edge.

Aspect 7: The apparatus of any of Aspects 1-6, wherein the undulating cross-sectional shape of each of the plurality of blades is symmetrical.

Aspect 8: The apparatus of any of Aspects 1-7, wherein each of the plurality of spacer arrays has no more than one bolt.

Aspect 9: The apparatus of any of Aspects 1-8, wherein the bolt passes between the first and second legs of each of the plurality of spacers.

Aspect 10: The apparatus of any of Aspects 1-9, wherein the first and second legs are identical in shape.

Aspect 11: The apparatus of any of Aspects 1-10, wherein the first leg of the at least one spacer extends away from the support strip at a first acute angle to a vertical plane and the second leg of the at least one spacer extends away from the support strip at a second acute angle to the vertical plane.

Aspect 12: The apparatus of Aspect 11, wherein the first acute angle and the second acute angle are each between 1 degree and 45 degrees.

Aspect 13: The apparatus of Aspect 11, wherein the first acute angle and the second acute angle are each between 1 degree and 20 degrees.

Aspect 14: The apparatus of any of Aspects 1-13, wherein each of the spacers and each of the plurality of blades is made of metal.

Aspect 15: The apparatus of any of Aspects 1-14, wherein each of the plurality of blades has a plurality of alignment slots.

Aspect 16: The apparatus of Aspect 15, wherein each of the plurality of spacers has a plurality of alignment tabs located on each of the first and second legs, wherein each of the alignment tabs is inserted at least partially through one of the plurality of alignment slots, thereby preventing the rotation or movement of each of the plurality of spacers relative to at least one of the plurality of blades.

Aspect 17: The apparatus of any of Aspects 1-16, wherein each of the first and second legs includes at least one notch formed therein.

Aspect 18: The apparatus of Aspect 17, wherein each of the first and second legs includes an upper edge and a lower edge and the at least one notch includes at least one notch on the upper edge and at least one notch on the lower edge.

Aspect 19: The apparatus of Aspect 17, wherein each of the plurality of blades comprises at least one impact zone and each of the at least one notches is aligned with one of the at least one impact zones.

Aspect 20: An apparatus comprising:
- a blade array comprising a plurality of blades that are vertically aligned, each of the plurality of blades having an undulating cross-sectional shape and being spaced apart from an adjacent blade by a plurality of spacers, each of the plurality of blades having a plurality of alignment slots, each of the plurality of spacers having first and second legs connected by a support strip and a plurality of alignment tabs located on each of the first and second legs, the support strip having a bolt aperture formed therein, each of the plurality of spacers being located in one of a plurality of spacer arrays, each of the plurality of spacers in any one of the plurality of spacer arrays being vertically aligned;
- wherein each of the plurality of spacer arrays has no more than one bolt;
- wherein each of the plurality of spacer arrays further includes a bolt that extends through all of the plurality spacers in that one of the plurality of spacer arrays, the bolt having first and second ends and a fastener secured to each of the first and second ends;
- wherein each of the alignment tabs is inserted at least partially through one of the plurality of alignment slots, thereby preventing the rotation or movement of each of the plurality of spacers relative to at least one of the plurality of blades; and
- wherein each of the plurality of spacers defines a blade spacing between two of the plurality of blades and each of the blades has a maximum rise, the maximum rise being at least twice the blade spacing.

Aspect 21: A method of constructing a drift eliminator, the method comprising the steps of:
- (a) forming a vertical blade array comprising a plurality of blades by stacking each of the plurality of blades alternately with a spacer layer comprising a plurality of spacers, each of the plurality of blades having an undulating cross-sectional shape and at least two blade bolt apertures formed therein, each of the plurality of spacers having first and second legs connected by a support strip, the support strip having a spacer bolt aperture formed therein;
- (b) preventing rotation of each of the plurality of spacers relative to an adjacent blade of the plurality of blades by inserting each of the at least one alignment tabs extending from each of the first and second legs into an alignment slot formed in the adjacent blade of the plurality of blades;
- (c) securing the vertical blade array by engaging a fastener to each of a top and bottom end of a bolt that extends through each of the at least two blade bolt apertures of each of the plurality of blades and the spacer bolt aperture of each of the plurality of spacers.

Aspect 22: A method of operating a cooling tower comprising installing in a crossflow configuration of the drift eliminator of Aspect 1.

Aspect 23: A method of constructing a drift eliminator, the method comprising the steps of:
- (a) providing a plurality of blades, each of the plurality of blades having a first end, a second end opposite the first end, a front edge extending between the first and second ends, and a rear edge extending between the first and second ends, the rear edge being positioned opposite the front edge, the plurality of blades including a first blade, the first blade including at least one first blade portion located between the first end and the second end of the first blade, the at least one first blade portion having an upper surface, a lower surface, and a plurality of alignment slots formed in the upper surface of the at least one first blade portion;
- (b) providing at least one spacer having a first leg, a second leg, and a support strip, each of the first and second legs including an upper edge and a lower edge, a front end extending from the top edge to the bottom edge, and a rear end extending from the upper edge to the lower edge, the rear end being positioned opposite the front end, the support strip extending laterally from the first leg to the second leg, the at least one spacer further including a plurality of alignment tabs extending from the first leg and the second leg; and
- (c) positioning the at least one spacer over the upper surface of the at least one first blade portion such that the lower edges of the first and second legs of the at least one spacer abut the upper surface of the at least one first blade portion and each of the plurality of alignment tabs interfaces with a corresponding one of the plurality of alignment slots.

Aspect 24: The method of Aspect 23, wherein the plurality of blades further includes a second blade, the second blade including at least one second blade portion located between the first end and the second end of the second blade, the at least one second blade portion having an upper surface, a lower surface, and a plurality of alignment slots formed in the upper surface of the at least one second blade portion; and;
- wherein the method further comprises the step of (d) positioning the second blade over the at least one spacer such that the bottom surface of the second blade portion interfaces with the upper edges of the first and second legs of the at least one spacer.

Aspect 25: The method of Aspect 24, further comprising the steps of:
- (e) providing at least one additional spacer having a first leg, a second leg, and a support strip, each of the first and second legs including an upper edge and a lower edge, a front end extending from the top edge to the bottom edge, and a rear end extending from the upper edge to the lower edge, the rear end being positioned opposite the front end, the support strip extending laterally from the first leg to the second leg, the at least one additional spacer further including a plurality of alignment tabs extending from the first leg and the second leg; and
- (f) positioning the at least one additional spacer over the upper surface of the at least one second blade portion such that the lower edges of the first and second legs of the at least one additional spacer abut the upper surface of the at least one second blade portion and each of the plurality of alignment tabs of the at least one additional spacer interfaces with a corresponding one of the plurality of alignment slots of the at least one second blade portion.

BRIEF DESCRIPTION OF THE DRAWINGS

For a more complete understanding of the present invention, reference is made to the following detailed description of embodiments considered in conjunction with the accompanying drawings, in which.

DETAILED DESCRIPTION

Figure 1A:
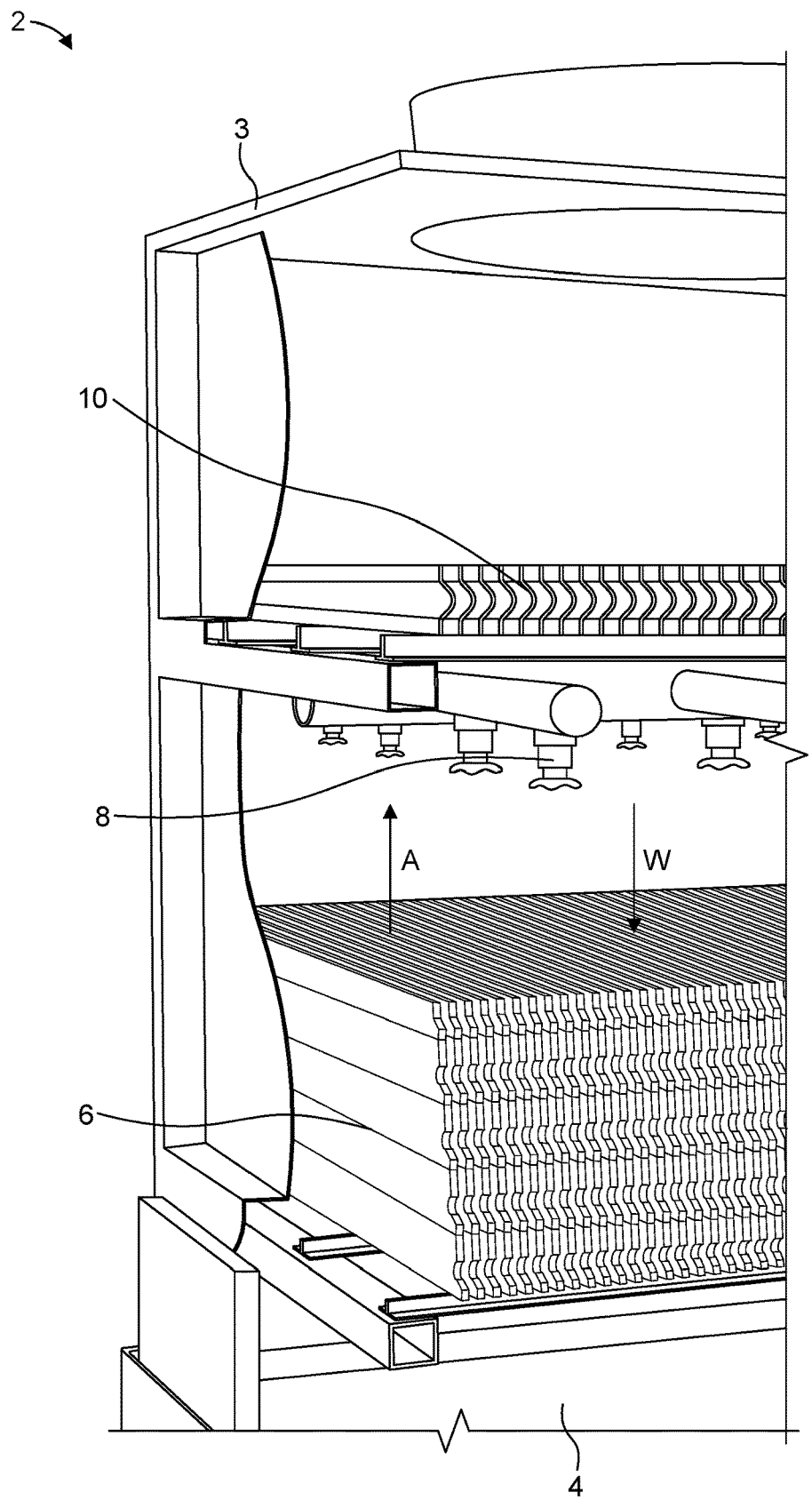
FIG. 1A is a schematic view of the interior of a cooling tower having a counterflow configuration.

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise stated. Additionally, the terms "comprises" and "comprising" when used herein specify that certain features are present in that embodiment but should not be interpreted to preclude the presence or addition of additional features, components, operations, and/or groups thereof.

The following disclosure is intended to be read in connection with the accompanying drawings, which are to be considered part of the entire written description of the invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

The present invention relates to a drift eliminator that is configured to be installed in either a counterflow or crossflow configuration in a cooling tower system. FIG. 1A illustrates a first exemplary cooling tower 2 in which a drift eliminator 10 is installed in a counterflow configuration. The cooling tower 2 includes a cooling tower housing 3 positioned over a water basin 4, the cooling tower housing 3 including fill media 6 positioned above the water basin 4, nozzles 8 positioned above the fill media 6, and the drift eliminator 10 positioned above the nozzles 8. The nozzles 8 are directed to distribute hot water over the fill media 6, which cools the hot incoming water by mixing it with cool air. The drift eliminator 10 is configured to cause water droplets in the effluent air travelling upward from the fill media 6 (in a flow direction indicated by arrow A) to impact the surface of the blades so that the water falls back into the water basin 4 (in a flow direction indicated by arrow W).

Figure 1B:
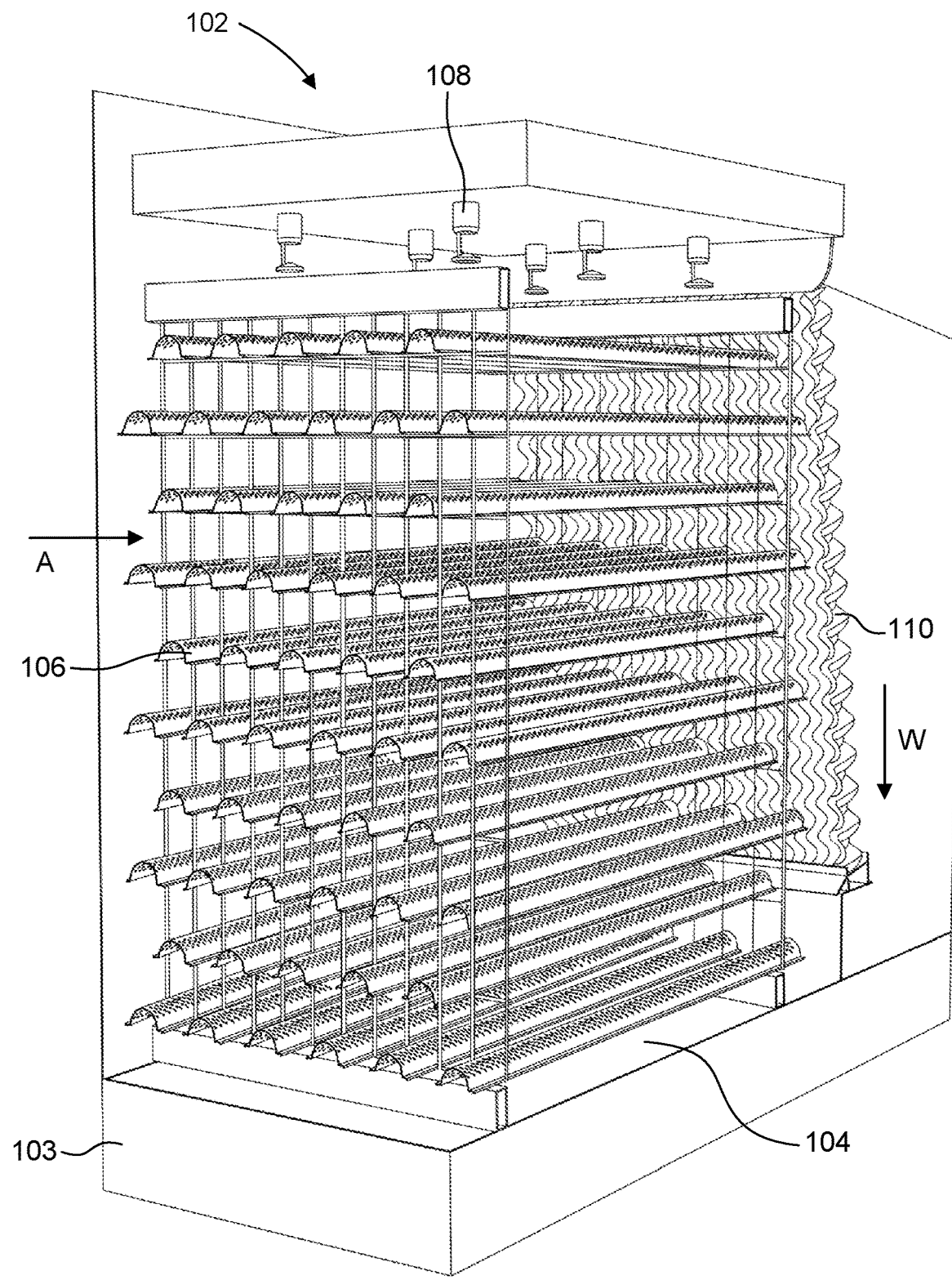
FIG. 1B is a schematic view of the interior of a cooling tower having a crossflow configuration.

FIG. 1B illustrates a second exemplary cooling tower 102 in which a drift eliminator 110 is installed in a crossflow configuration. The system 102 includes a cooling tower housing 103 positioned over a water basin 104, the cooling tower housing 103 including fill media 106 positioned above the water basin 104, nozzles 108 positioned above the fill media 106, and the drift eliminator 110 positioned to the side of the fill media 106. The nozzles 108 are directed to distribute hot water over the fill media 106, which cools the hot incoming water through evaporation into the air. The drift eliminator 110 is configured to cause water droplets in the effluent air moving across the fill media 106 (in a flow direction indicated by arrow A) to impact the surface of the blades so that the water falls back into the water basin 104 (in a flow direction indicated by arrow W). It should be understood that the exemplary cooling towers 2, 102 are two of many possible cooling tower configurations and are provided for the purpose of illustrating the environment in which the drift eliminator 10, 110 could be used.

Figure 2:
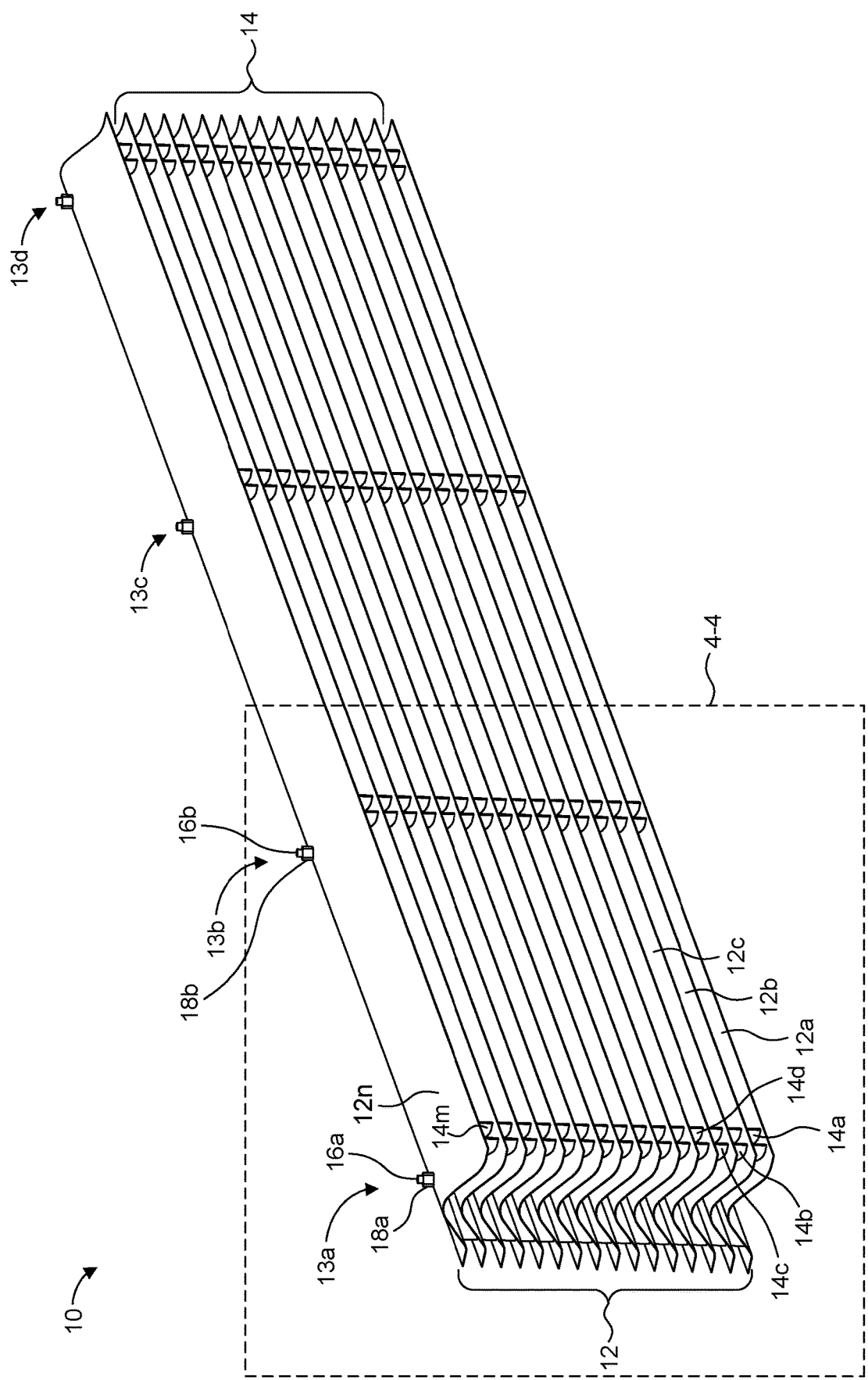
FIG. 2 is a perspective view of an exemplary drift eliminator.
Figure 3:
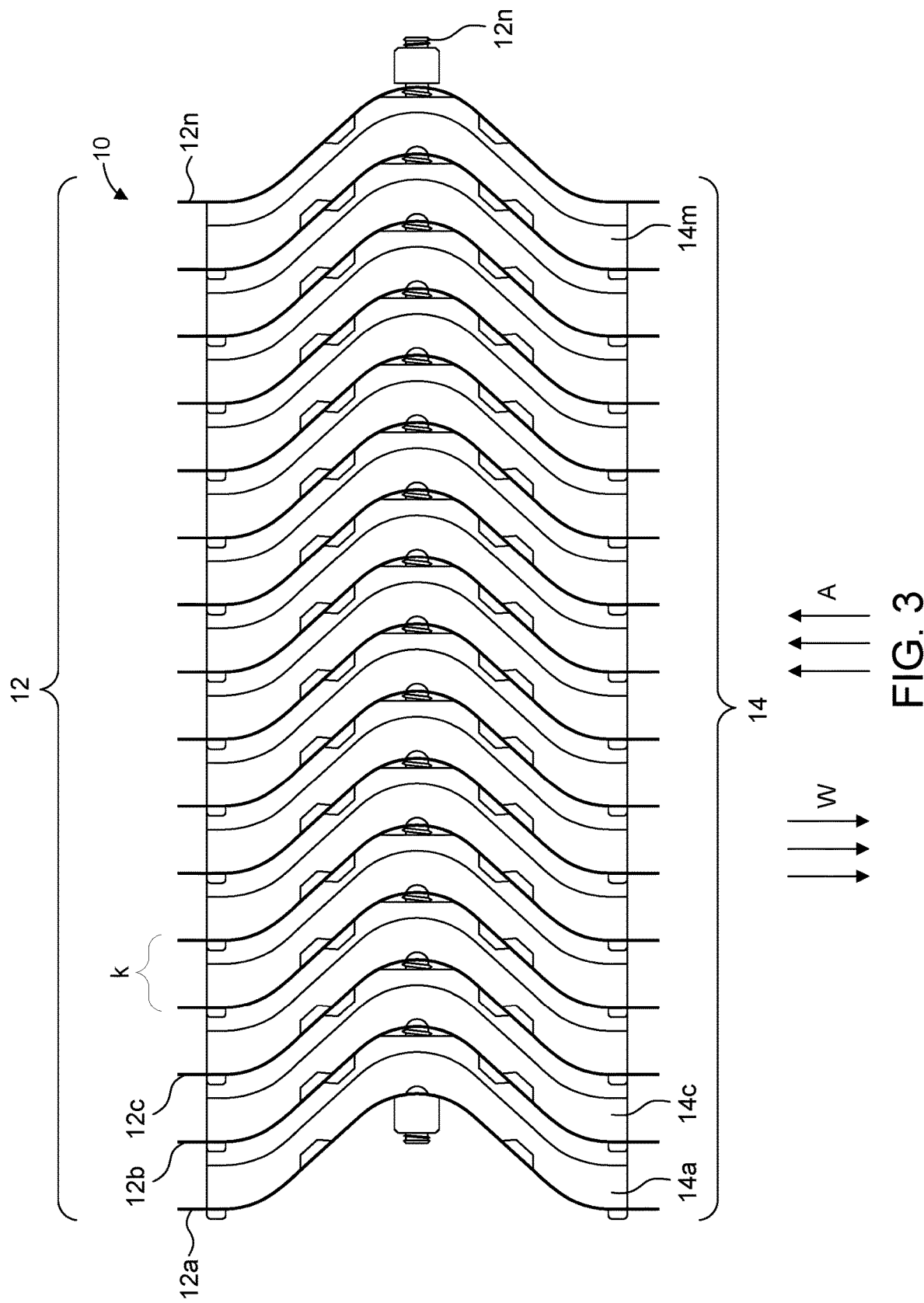
FIG. 3 is a side elevational view of the drift eliminator shown in FIG. 2.

FIGS. 2-3 illustrate the drift eliminator 10 in greater detail. The drift eliminator 10 comprises a plurality of blades 12a-12p that are spaced apart by a corresponding plurality of spacers 14a-14m and arranged in a vertically-aligned array. One layer of spacers 14a-14m is positioned between each of the blades 12a-12n. In this embodiment, each layer comprises four spacers. The blades 12a-12n and spacers 14a-14m are held together with threaded bolts 16a, 16b that are secured on each end by nuts 18a, 18b. Alternately, any suitable fastener could be substituted for the nuts 18a, 18b. For example, cotter pins, clamps, wire, clips, or a welded piece could be used, or the ends of the bolts could be bent or flattened to provide a fastening function.

Each spacer (for example, spacer 14a) is positioned between a pair of blades (for example, blades 12a, 12b), and has two or more spacers of the plurality of spacers 14 positioned there between (see, e.g. spacers 14a and 14b in FIG. 3), ensuring that a predetermined spacing k is maintained between each of the plurality of blades 12a-12n. Such spacing k is preferably between 0.5 inches and 1.5 inches and, more preferably, between 0.8 and 1.2 inches. As will be explained herein, the spacing k is also preferably smaller than the maximum rise of each of the plurality of blades.

The spacers 14a-14m are preferably arranged in vertical arrays 13a, 13b, 13c, 13d, which are spaced along the length of the blades 12a-12n. In this exemplary embodiment, spacing between vertical arrays 13a-d is preferably no more than 24 inches and vertical arrays 13a and 13d located at the ends of the blades 12a-12n are preferably inset at least 2 inches from the ends of the blades 12a-12n.

Each of the plurality of spacers 14a-14n is preferably a separate structure from every other spacer. This is in contrast to conventional metal drift eliminators, in which each array of spacers is a unitary structure. The separate structure for the spacers of 14a-14n is preferred in this embodiment because it provides greater modularity.

Each of the plurality of blades 12a-12n preferably has an undulating or sinusoidal cross-sectional shape that forces an air stream traveling across the transverse axis of the blades (for example, in direction from left to right in FIG. 13A) to change direction and velocity as the air stream passes through the drift eliminator 10 and out of the cooling tower. The goal of the cross-sectional shape of the plurality of blades is to maintain momentum of the air stream flowing across the blades 12a-12n, while causing water droplets contained within the air stream to "crash" into the surface of the blade and fall back into the water basin 4.

Figure 4:
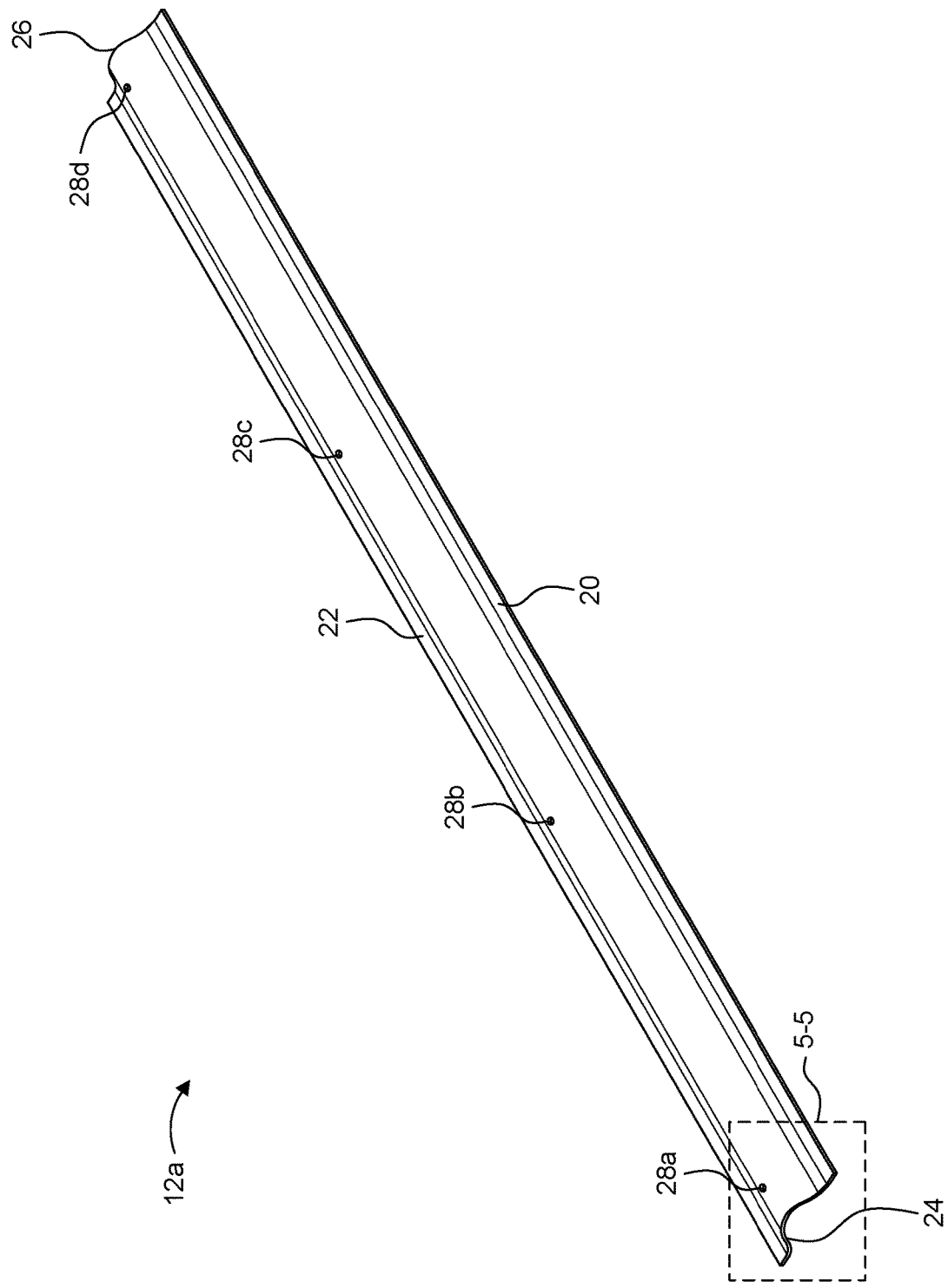
FIG. 4 is a top perspective view of a representative blade of the drift eliminator shown in FIG. 2.

FIG. 4 illustrates a first blade 12a, which is representative of each the plurality of blades 12a-12n shown in FIGS. 2-3. The first blade 12a has a front edge 20, a rear edge 22, a first end 24, and a second end 26, with a depth $d_b$ representing the distance between the front edge 20 and the rear edge 22. In one embodiment, the depth $d_b$ of the first blade 12a is between 5.50 inches and 6.0 inches. In another embodiment, the depth $d_b$ is approximately 5.75 inches (with a tolerance of plus or minus 0.125 inches). The first blade 12a includes a plurality of bolt holes 28a-28d positioned along the length of the first blade 12a and extending through the first blade 12a from an upper blade surface 30 to a lower blade surface 32. These bolt holes 28a-28d are sized and shaped to receive a bolt (see bolts 16a, 16b in FIG. 15) which is used to secure the plurality of blades 12 and plurality of spacers 14 together to form the drift eliminator 10 shown in FIG. 2. Preferably at least two bolt holes 28a, 28d are provided in each blade 12a.

Figure 5:
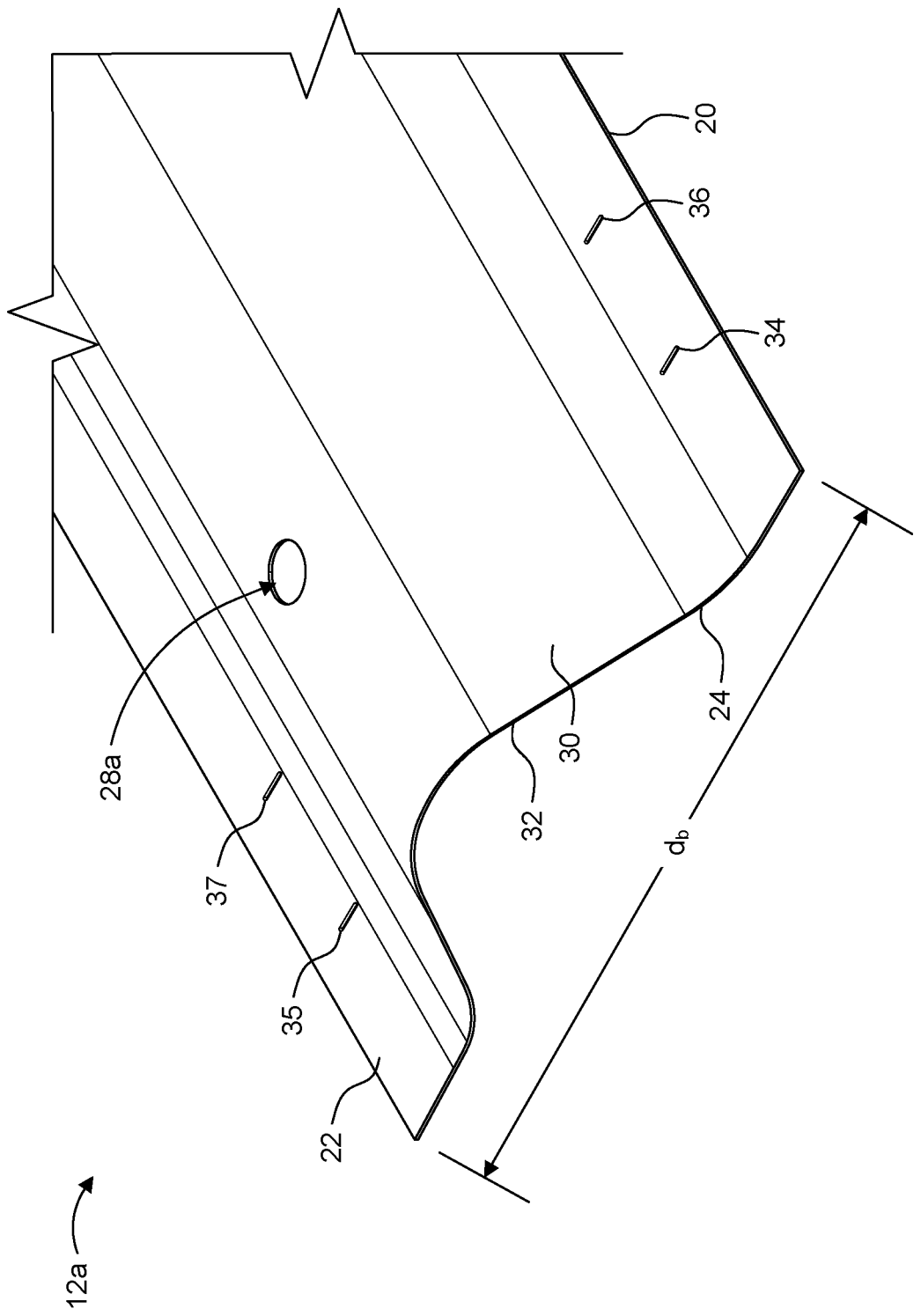
FIG. 5 is an enlarged partial view of area 5-5 of FIG. 4.

As seen in FIG. 5, each of the bolt holes 28a-28d (see first bolt hole 28a) are positioned between two pairs of alignment slots 34, 36 and 35, 37. A first pair of alignment slots 34, 36 is positioned between the first bolt hole 28a and the front edge 20 of the first blade 12a. The second pair of alignment slots 35, 37 are located between the first bolt hole 28a and the rear edge 22 of the first blade 12a. As will be described herein, the alignment slots 34-37 are sized, shaped and positioned to receive portions of the spacer 14a (see FIG. 7), which stabilizes the position of the spacer 14a relative to the first blade 12a.

Figure 6:
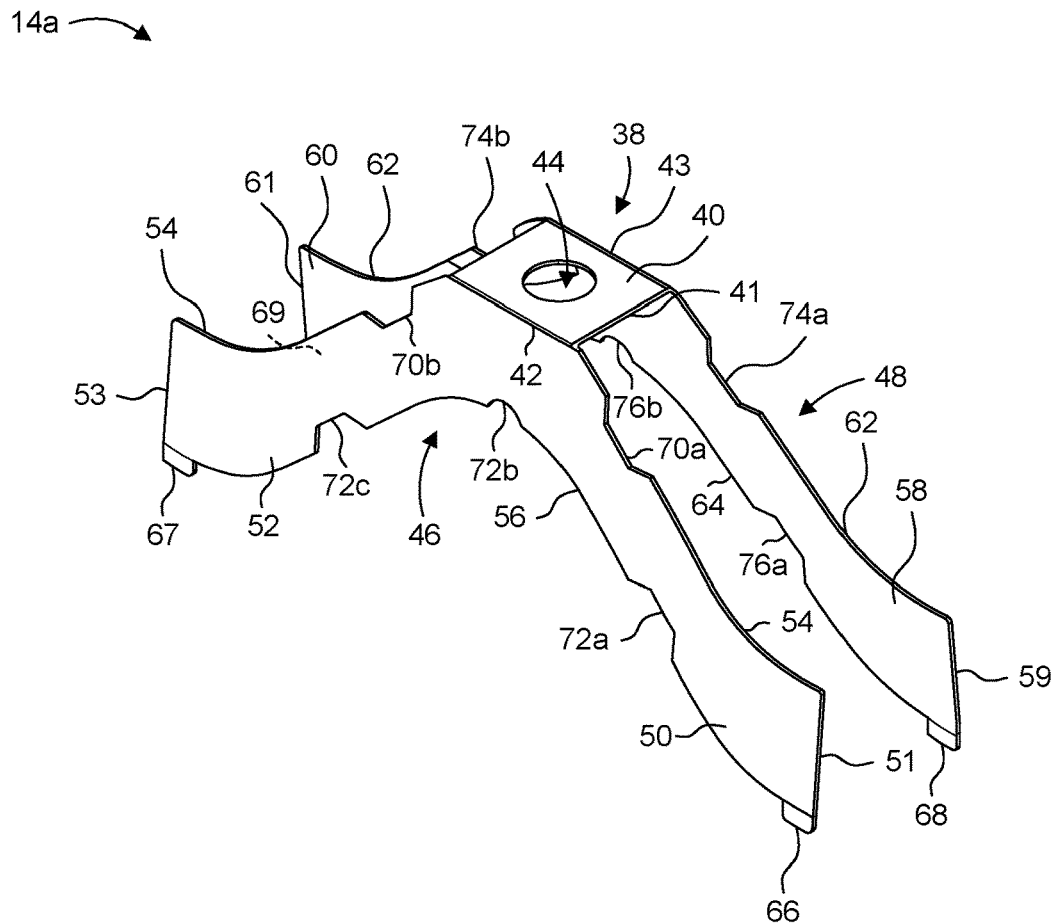
FIG. 6 is a perspective view of a first exemplary spacer.

FIGS. 6-9 illustrate a first spacer 14a which is representative of all of the plurality of spacers 14a-14n shown in FIGS. 2-3. Referring to FIG. 6, the first spacer 14a includes a support strip 38 having an upper surface 40, a lower surface 41, a first strip edge 42, an opposing parallel second strip edge 43, and a bolt hole 44 positioned between the first and second strip edges 42, 43 and extending from the upper surface 40 to the lower surface 41 of the support strip 38. The first spacer 14a also includes a first leg 46 extending downwardly from one side of the support strip 38 and a second leg 48 extending downwardly from an opposing side of the support strip 38.

The first leg 46 includes a first front wing 50 that extends from the first strip edge 42 to a first front end 51, a first rear wing 52 extending to a first rear end 53 opposite the first front end 51, a first upper edge 54 and a first lower edge 56 opposite the first upper edge 54. Both the first upper and lower edges 54, 56 extend from the first front end 51 to the first rear end 53, with the first upper edge 54 being coincident with the first strip edge 42 at the support strip 38. Likewise, the second leg 48 includes a second front wing 58 extending from the second strip edge 43 to a second front end 59, a second rear wing 60 extending from the second strip edge 43 to a second rear end 61 opposite the second front end 59, a second upper edge 62 and a second lower edge 64 opposite the second upper edge 62. Both the second upper and lower edges 62, 64 extend from the second front end 59 to the second rear end 61, with the second upper edge 62 being coincident with the second strip edge 43 at the support strip 38.

The first and second upper edges 54, 62 and first and second lower edges 56, 64 have undulating shapes similar to the undulating shape of each of the plurality of blades 12 such that the first and second lower edges 56, 64 interface with the upper blade surface 30 of any one of the plurality of blades 12 (e.g., first blade 12a) and the first and second upper edges 54, 62 interface with the lower blade surface 32 of any one of the plurality of blades 12 (e.g., first blade 12a). The first leg 46 and the second leg 48 are sized and shaped to be mirror images of each other, and as such, the features of the second leg 48 are sized and shaped to mirror their counterpart features in the first leg 46.

Figure 7:
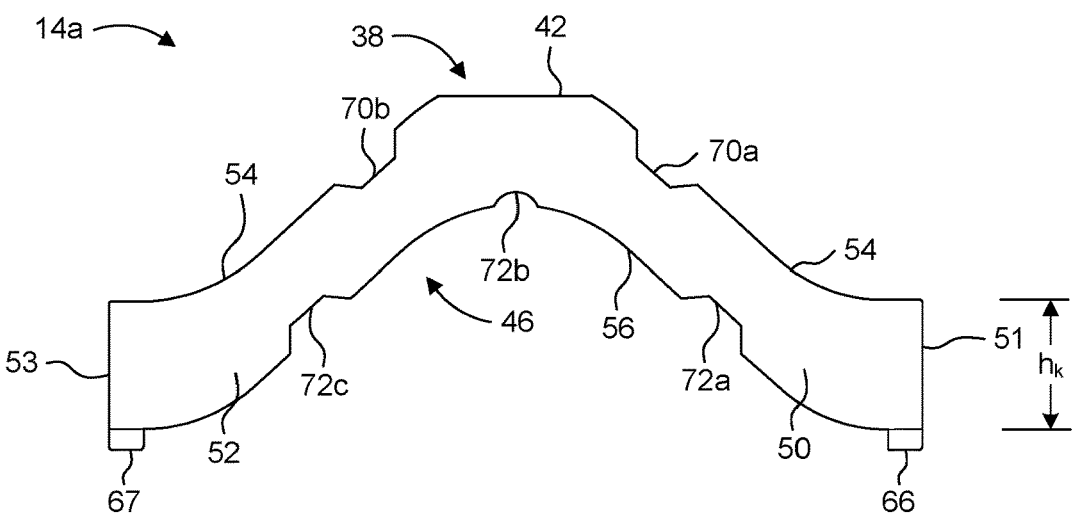
FIG. 7 is a side elevational view of the spacer shown in FIG. 6.

Referring to FIGS. 6 and 7, the first spacer 14a also includes alignment tabs 66-69 that extend downwardly from the first and second lower edges 56, 64 of the first and second legs 46, 48, respectively. More particularly, a first front alignment tab 66 extends from the first lower edge 56 proximate to the first front end 51, the first rear alignment tab 67 extends from the first lower edge 56 proximate to the first rear end 53, the second front alignment tab 68 extends from the second lower edge 64 proximate to the second front end 59, and the second rear alignment tab 69 extends from the second lower edge 64 proximate to the second rear end 61. Each of the alignment tabs 66-69 is sized and shaped to interfit with a corresponding one of the alignment slots 34-37, as will be discussed further below.

Each of the first and second legs 46, 48 preferably includes notches formed in the first and second upper edges 54, 62 and the first and second lower edges 56, 64, respectively. In one embodiment, at least two notches are formed in the first upper edge 54 (see first upper notches 70a, 70b) and in the first lower edge 56 (see first lower notches 72a, 72b, 72c) in the first leg, and at least two notches are formed in the second upper edge 62 (see second upper notches 74a, 74b) and the second lower edge 64 (see second lower notches 76a, 76b; other notches not shown). As will be described in greater detail herein, these notches are shaped and located to allow for liquid that collects on the blades 12a-12n to pass through the first spacer 14a, enabling the liquid to drain more easily, which inhibits mold growth and corrosion on the blades 12a-12n and spacers 14a-14n and prevents draining water from being blown out of the drift.

Figure 8:
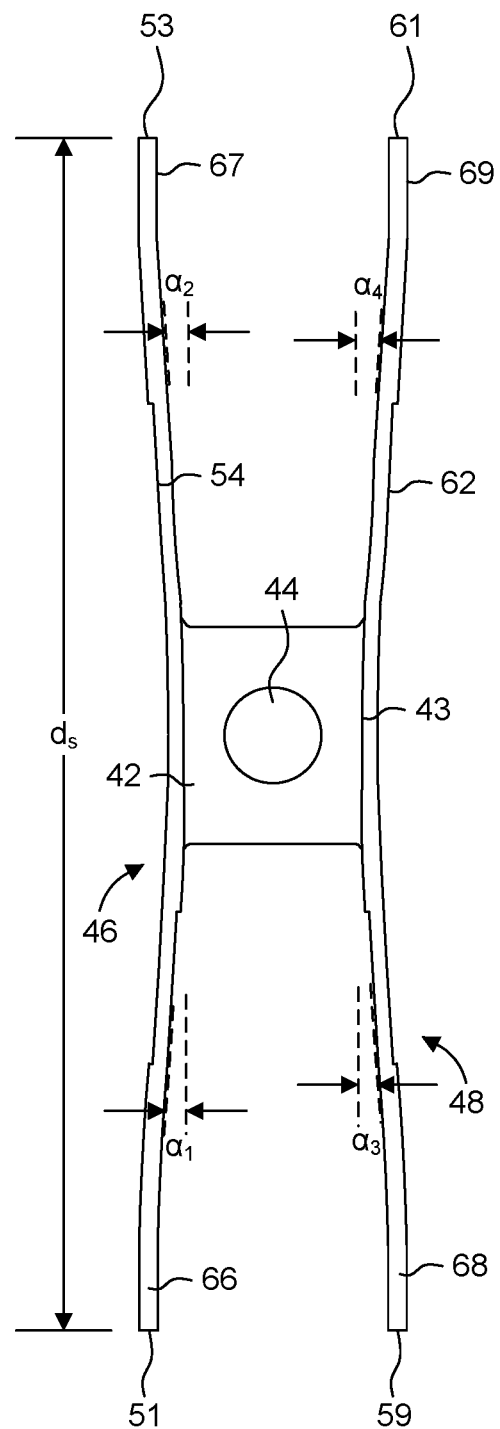
FIG. 8 is a top plan view of the spacer shown in FIG. 6.
Figure 9:
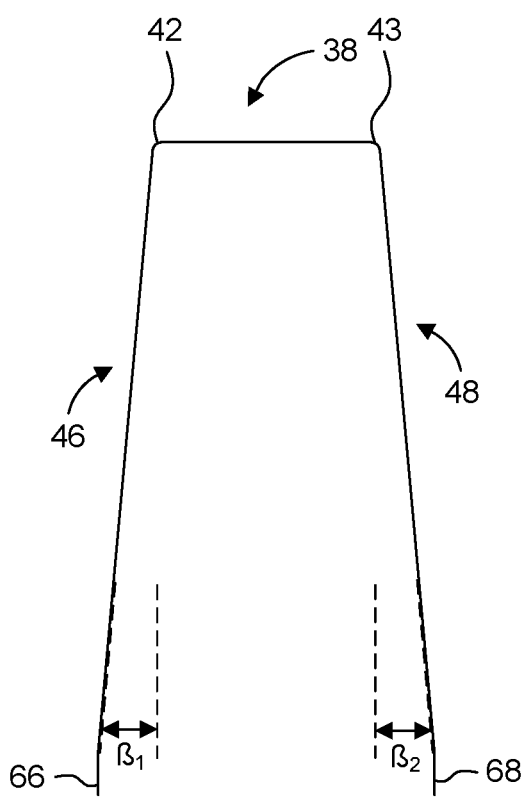
FIG. 9 is a front elevational view of the spacer shown in FIG. 6.

Referring to FIGS. 8 and 9, the first front and rear wings 50, 52 and the second front and rear wings 58, 60 are splayed from the support strip 38 such that they extend longitudinally and laterally from the support strip 38 to their respective ends (i.e., the first front and rear ends 51, 53 and to the second front and rear ends 59, 61, respectively). This creates a lateral angle between the first front and rear wings 50, 52 and the first strip edge 42 (see first front lateral angle $\alpha_1$ and first rear lateral angle $\alpha_2$) and a lateral angle between the second front and rear wings 58, 60 and the second strip edge 43 (see second front lateral angle $\alpha_3$ and second rear lateral angle $\alpha_4$). Each one of the lateral angles $\alpha_1$-$\alpha_4$ is a slightly acute angle ranging between 3 degrees and 10 degrees, preferably between 3 degrees and 5 degrees, to its respective one of the first and second strip edges 42, 43. In one embodiment, all of the lateral angles $\alpha_1$-$\alpha_4$ are identical. Likewise, this splayed positioning also creates a first vertical angle $\beta_1$ between the first leg 46 and the vertical plane that is coplanar with the first strip edge 42 and a second vertical angle $\beta_2$ between the second leg 48 and the vertical plane that is coplanar with the second strip edge 43. Each of the first and second vertical angles $\beta_1$, $\beta_2$ is a slightly acute angle ranging between 3 degrees and 10 degrees, preferably between 3 degrees and 5 degrees, to its respective vertical plane. This splayed positioning facilitates lateral stability of the first spacer 14a on top of one of the plurality of blades 12 while allowing a second spacer (e.g., spacer 14c in FIGS. 2-3) to stack on top of the first spacer 14a in a nested relationship.

The first spacer 14a has a depth $d_s$ that is measured from the first and second front ends 51, 59 to the first and second rear ends 53, 61 and a height $h_k$ that is measured from the lowest point of the first and second lower edges 56, 64 (not including the alignment tabs 66-69) to the lowest point of the first and second upper edges 54, 62. The height $h_k$ of the first spacer 14a is equivalent to the distance k between two of the plurality of blades 12 when the drift eliminator 10 is formed, and the depth $d_s$ of the first spacer 14a is preferably shorter than the depth $d_b$ of the first blade 12a. In one embodiment, the depth $d_s$ is between 4.50 inches and 5.50 inches. In another embodiment, the depth $d_s$ is 5.00 inches, plus or minus 0.125 inches.

The first spacer 14a can be made from a single piece of metal sheeting cut to the shape shown in FIGS. 6-9. Once cut, the first leg 46 can be bent downward along the first strip edge 42 and the second leg 48 can be bent downward along the second strip edge 43. The first front and rear wings 50, 52 and the second front and rear wings 58, 60 can be bent slightly toward each other, respectively, about the middle portions of the first and second legs 46, 48, respectively, to provide the splayed orientation shown in FIG. 8. The alignment tabs 66-69 can then be bent to have a vertical orientation for ease of connecting with the alignment slots 34-37 of the first blade 12a, as discussed further below.

FIGS. 10A, 10B and 11A, 11B show second and third exemplary embodiments, respectively, of the first spacer 14a. The elements illustrated in FIGS. 10A, 10B, 11A, and 11B, which correspond to the elements described above with respect to FIGS. 6 and 7, have been designated by corresponding reference numbers increased by one hundred and two hundred, respectively. Any element identified in any of FIGS. 10A, 10B, 11A, and 11B in the attached drawings but not specifically discussed in the specification should be assumed as having the same or similar structure and function as its corresponding element shown in the spacer 14a, shown in FIGS. 6-9.

Figure 10A:
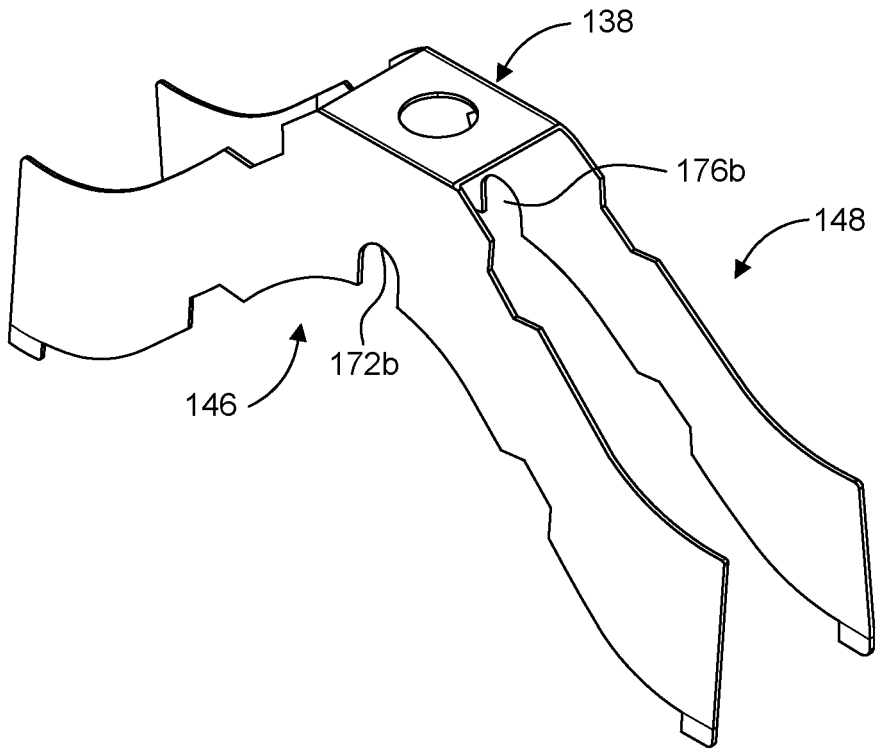
FIG. 10A is a perspective view of a second exemplary spacer.
Figure 10B:
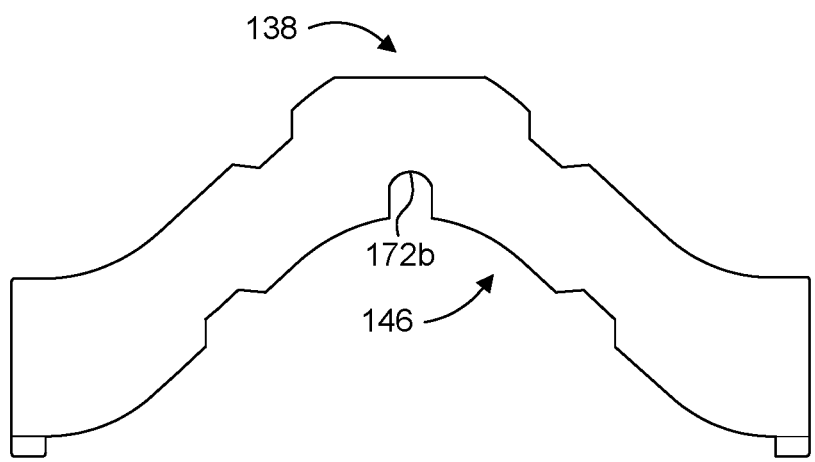
FIG. 10B is a side elevational view of the spacer shown in FIG. 10A.

Referring to FIGS. 10A and 10B, the spacer 114a is nearly identical to the first spacer 14a discussed above, with the exception of the centermost notches in the first and second legs 146, 148 located proximate to the support strip 138 (i.e., first and second center notches 172b and 176b). These notches extend more deeply into first and second legs 146, 148 to provide for increased drainage.

Figure 11A:
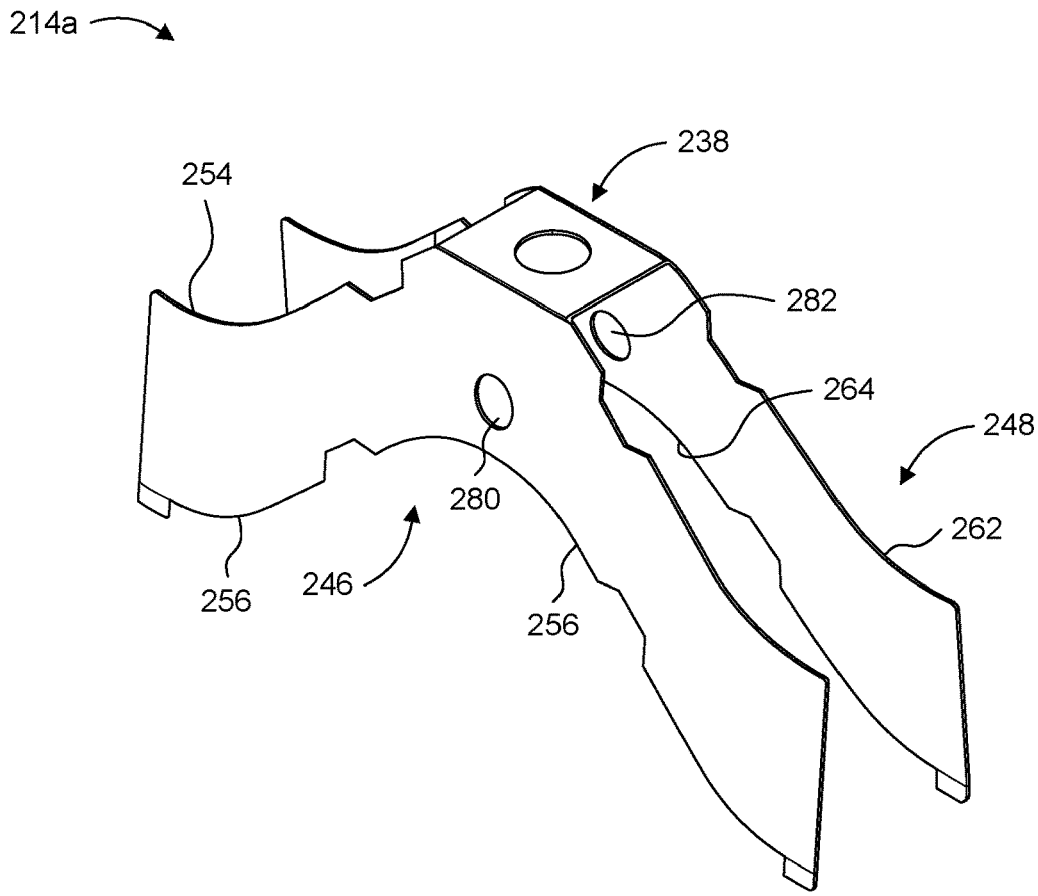
FIG. 11A is a perspective view of a third exemplary spacer.
Figure 11B:
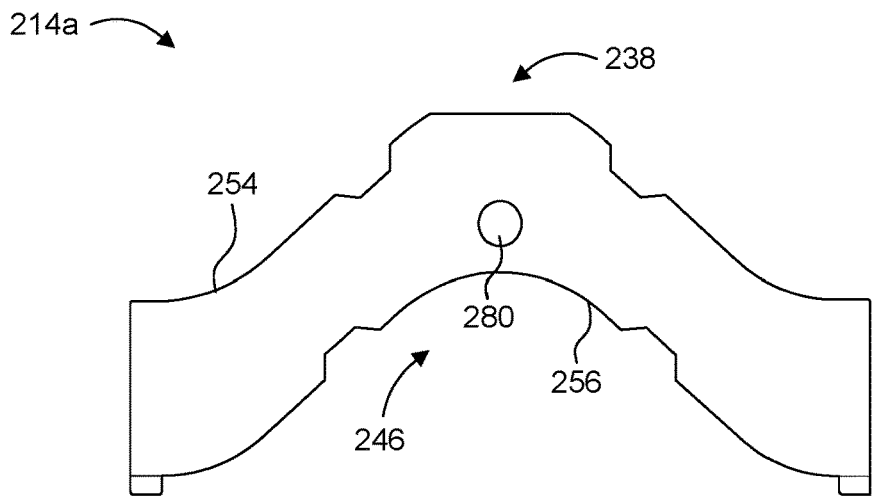
FIG. 11B is a side elevational view of the spacer shown in FIG. 11A.

Referring to FIGS. 11A and 11B, the spacer 214a is also nearly identical to the first spacer 14a discussed above, except that the centermost notches (172b, 176b; see FIG. 11A) in the first and second legs 246, 248 located proximate to the support strip 238 have been replaced with lateral through-going holes 280, 282 positioned between the first and second upper edges 254, 262 and the first and second lower edges 256, 264. This allows for water drainage while giving the first and second lower edges 256, 264 more surface-to-surface engagement when the spacer 214a is placed on the top surface of one of the plurality of blades 12.

Figure 12:
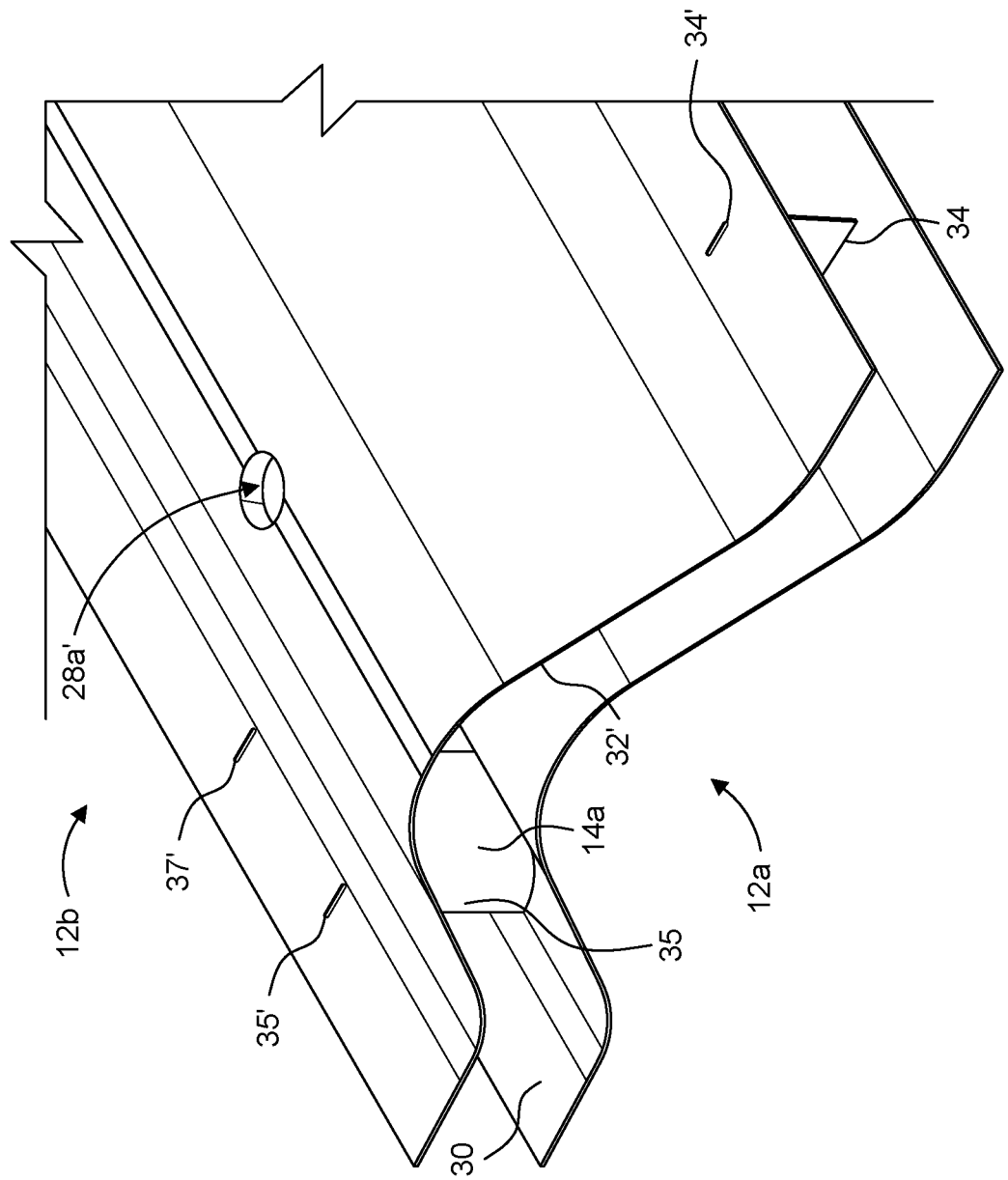
FIG. 12 is an enlarged partial view of an assembly consisting of the spacer shown in FIG. 6 sandwiched between two of the blades shown in FIG. 5.
Figure 13A:
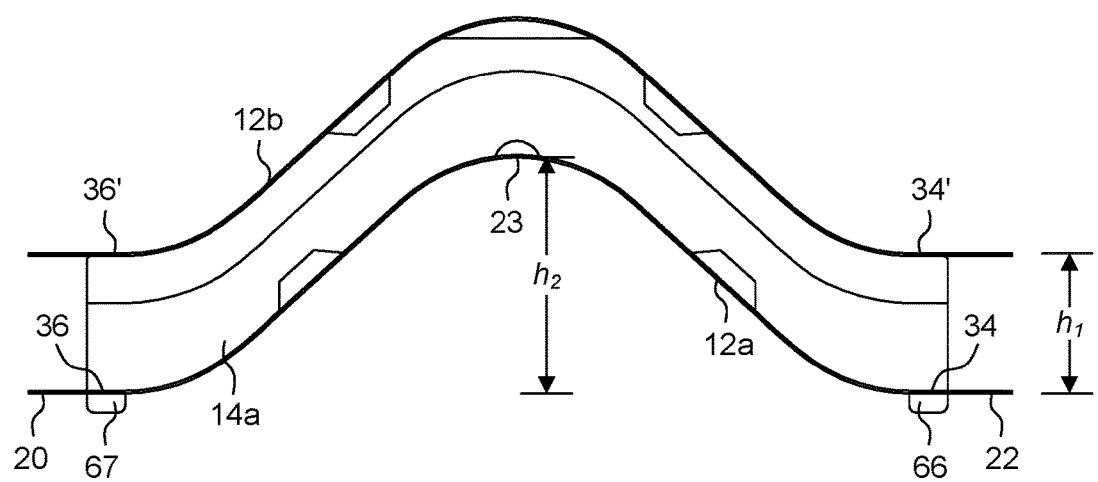
FIGS. 13A & B are side elevational views of the assembly of FIG. 12.
Figure 13B:
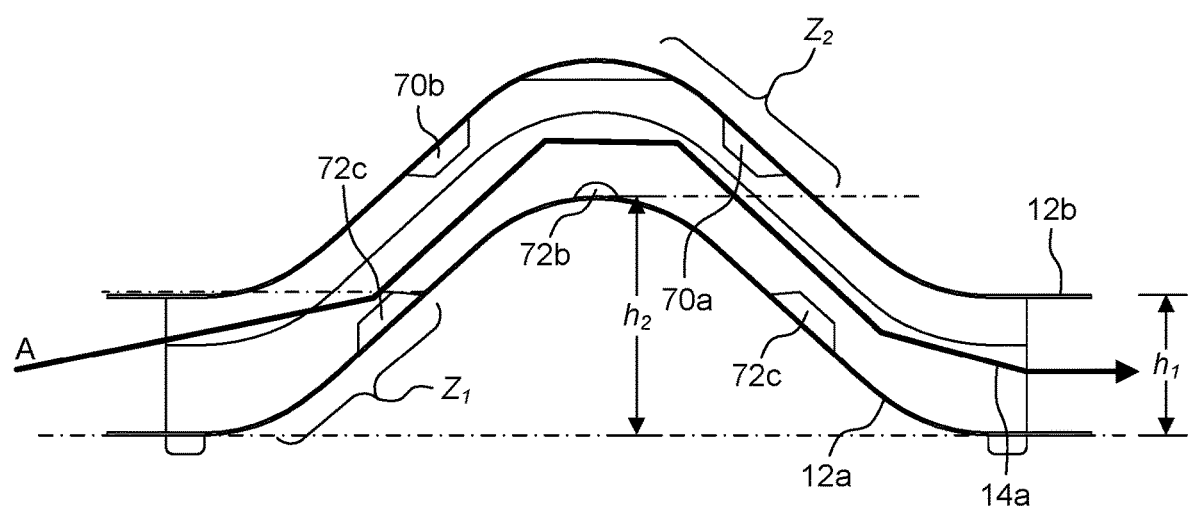
Figure 14:
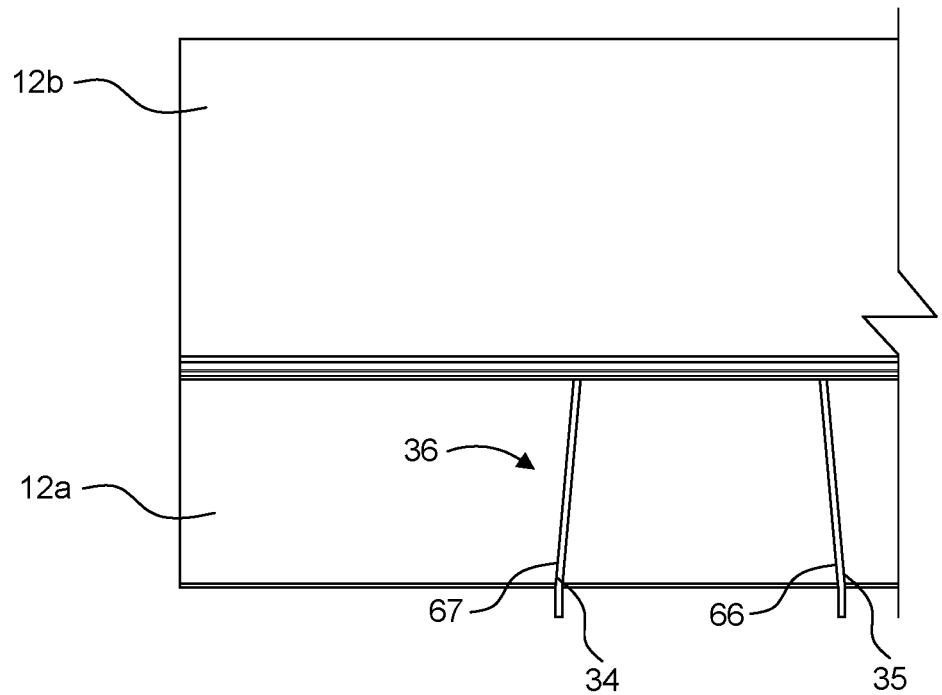
FIG. 14 is a front elevational view of the assembly of FIG. 12.

FIGS. 12-14 illustrate a first blade 12a stacked on top of a second blade 12b with a first spacer 14a positioned therebetween. The first spacer 14a engages the first blade 12a by inserting each of the alignment tabs 66-69 of the first spacer 14a into a corresponding one of the alignment slots 34-37 of the first blade 12a (i.e., the first front alignment tab 66 is inserted in the first front alignment slot 34; the first rear alignment tab 67 is inserted into the first rear alignment slot 35; the second front alignment tab 68 is inserted into the second front alignment slot 35; and the second rear alignment tab 69 is inserted into the second rear alignment slot 37). This gives the first spacer 14a lateral and longitudinal stability while resting on the upper blade surface 30 of the first blade 12a. Thereafter, a second blade 12b is placed such that the lower blade surface 32' of the second blade 12b rests on top of the first and second upper edges 54, 62 of the first spacer 14a. In particular, the second blade 12b is placed over the first spacer 14a such that the first bolt hole 28a' of the second blade 12b is coaxially aligned with the bolt hole 44 of the first spacer 14a. Due to the shape of the first and second front and rear wings 50, 52, 58, 60 of the first spacer 14a, the alignment slots 34'-37' of the second blade 12b are unobstructed by the first spacer 14a. Thereafter, additional spacers and blades of the pluralities of spacers 14 and blades 12 are interleaved to create a drift eliminator 10 of a desired height.

Referring to FIGS. 13A & 13B, and as discussed above, the shape and spacing of the blades 12a, 12b is designed to cause water droplets in the air stream to impact the blades 12a, 12b. In this embodiment, the maximum blade rise $h_2$ of each of the blades 12a, 12b (the difference in height between each end of the blade 12a, 12b and its highest point or "apex" 23) is significantly greater than the blade spacing $h_1$ (the spacing between adjacent blades 12a, 12b). Preferably, maximum blade rise $h_2$ is greater than the blade spacing $h_1$. In some embodiments the maximum blade rise $h_2$ is at least 20% greater than the blade spacing $h_1$ and in other embodiments, the maximum blade rise $h_2$ is at least 50% greater than the blade spacing $h_1$. The air stream generally follows the shape of the blades 12a, 12b.

An air stream passing through the blades 12a, 12b will roughly follow the path shown by line A. Due to the cross-sectional shape of the blades, 12a, 12b, larger particles contained in the air (such as water droplets) will impact the lower blade 12a along a lower impact zone $Z_1$. Medium size particles (such as smaller water droplets) miss the lower impact zone $Z_1$ but then impact an upper impact zone $Z_2$. Smaller particles will flow through and exit the blades 12a, 12b without impact. Due to the impact, water droplets lose momentum in the lower and upper impact zones $Z_1$, $Z_2$, become separated from the air stream, and drain from the blades 12a, 12b back into the cooling tower system. In the event that the air stream flow is reversed, the lower and upper impact zones $Z_1$, $Z_2$ would mirror those shown in FIG. 13A.

Each of the notches 70a-b and 72a-c is preferably aligned with one of the impact zones $Z_1$, $Z_2$ in order to enhance drainage of water from the blades 12a, 12b. For example, the lower notch 72c is aligned with the lower impact zone $Z_1$ and the upper notch 70a is aligned with the upper impact zone $Z_2$. For design purposes, the location of the impact zones (and therefore the preferred locations of the spacer notches) is preferably determined using computational fluid dynamics analysis.

Figure 15:
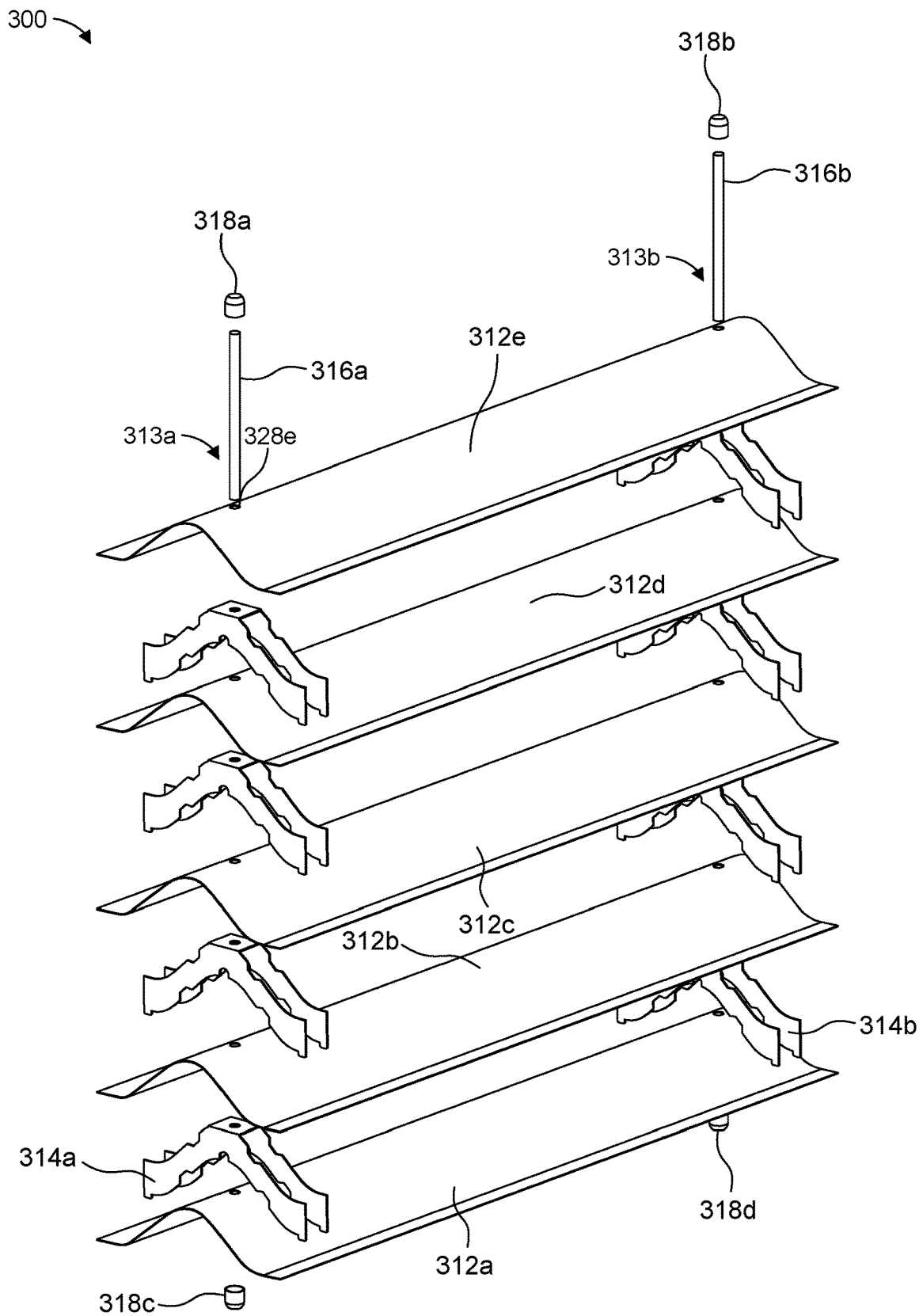
FIG. 15 is an exploded view of a draft eliminator comprising five blades.

Referring again to FIG. 15, a drift eliminator 300 is shown, which is a simplified version of the drift eliminator 10—having only five shortened blades 312a-312e. FIG. 15 illustrates how the bolts 316a, 316b and nuts 318a-318d are used to fully assemble the drift eliminator 300. The blades 312a-312e are stacked alternately with two vertical arrays of spacers 314a-314b The position of the spacers 314a-314e relative to the blades 312a-312e is fixed by the interlocking of alignment slots and tabs described above in connection with FIGS. 12-14. Then bolts 316a are inserted through each of the vertical arrays 313a, 313b and secured with nuts 318-318d.

The assembly method and structure of the drift eliminator of the present invention provides a modular system that can be used to efficiently create drift eliminators of different sizes. Taller assemblies can be created simply by stacking a larger number of blades and spacers and providing longer bolts. Similarly, shorter assemblies can be provided by stacking a smaller number of blades and spacers and providing shorter bolts or cutting longer bolts. Assemblies having less length can be provided by either using shorter blades or cutting the blades to a shorter length. Regardless of the size, the same spacer part can be used.

It should also be understood that the described invention could be advantageously used in other applications in which it is desirable to remove water droplets from an air stream, such as, louvers, air scrubbers, and handlers.

All examples and conditional language recited herein are intended for pedagogical purposes to aid the reader in understanding the principles of the present invention and the concepts contributed by the inventor in furthering the art. As such, they are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the invention. All such variations and modifications are intended to be included within the scope of the invention, as defined by the following claims.

The invention claimed is:

1. An apparatus comprising:
a blade array comprising a plurality of blades that are vertically aligned and a plurality of spacers, each blade of the plurality of blades having an undulating cross-sectional shape and being spaced apart from an adjacent blade by a spacer, each spacer of the plurality of spacers having first and second legs connected by a support strip, the support strip having a bolt aperture formed therein;

each leg having a first upper edge, a second upper edge, a first lower edge, and a second lower edge, wherein at least one notch is defined in at least one of the first and second upper edges and first and second lower edges, wherein the at least one notch defines an opening that is adapted to allow liquid to pass through each spacer of the plurality of spacers;

each spacer of the plurality of spacers being located in one of a plurality of spacer arrays, each of the plurality of spacers in any one of the plurality of spacer arrays being vertically aligned;

wherein each of the plurality of spacer arrays further includes a bolt that extends through all of the plurality of spacers in that one of the plurality of spacer arrays.

2. The apparatus of claim 1, wherein each spacer of the plurality of spacers defines a blade spacing between two adjacent blades of the plurality of blades and each of the plurality of blades has a maximum rise, the maximum rise being greater than the blade spacing.

3. The apparatus of claim 2, wherein the maximum rise is at least 20% greater than the blade spacing.

4. The apparatus of claim 2, wherein the maximum rise is at least twice the blade spacing.

5. The apparatus of claim 1, wherein the undulating cross-sectional shape of each blade of the plurality of blades extends downwardly from an apex to a front edge and a rear edge.

6. The apparatus of claim 1, wherein the undulating cross-sectional shape of each blade of the plurality of blades is symmetrical.

7. The apparatus of claim 1, wherein each of the plurality of spacer arrays has no more than one bolt.

8. The apparatus of claim 1, wherein the bolt passes between the first and second legs of each of the plurality of spacers.

9. The apparatus of claim 1, wherein the first and second legs are identical in shape.

10. The apparatus of claim 1, wherein the first leg of each of the plurality of spacers extends away from the support strip at a first acute angle to a vertical plane and the second leg of each of the plurality of spacers extends away from the support strip at a second acute angle to the vertical plane.

11. The apparatus of claim 10, wherein the first acute angle and the second acute angle are each between 1 degree and 45 degrees.

12. The apparatus of claim 10, wherein the first acute angle and the second acute angle are each between 1 degree and 20 degrees.

13. The apparatus of claim 1, wherein each of the plurality of spacers and each of the plurality of blades is made of metal.

14. The apparatus of claim 1, wherein each of the plurality of blades has a plurality of alignment slots, each of the plurality of alignment slots extending through the upper blade surface of each of the plurality of blades.

15. The apparatus of claim 14, wherein each of the plurality of spacers has a plurality of alignment tabs located on each of the first and second legs, wherein each of the alignment tabs is inserted at least partially through one of the plurality of alignment slots, thereby preventing rotation or movement of each of the plurality of spacers relative to at least one of the plurality of blades.

16. The apparatus of claim 1, wherein each of the first and second legs includes an upper edge and a lower edge and the at least one notch includes at least one notch on the upper edge and at least one notch on the lower edge.

17. The apparatus of claim 1, wherein each of the plurality of blades comprises at least one impact zone and each of the at least one notches is aligned with one of the at least one impact zone.

18. The apparatus of claim 1, wherein the bolt includes a first end and a second end, wherein a fastener is secured to at least one of the first end or the second end.

\* \* \* \* \*